UNITED STATES PATENT OFFICE 1,921,131

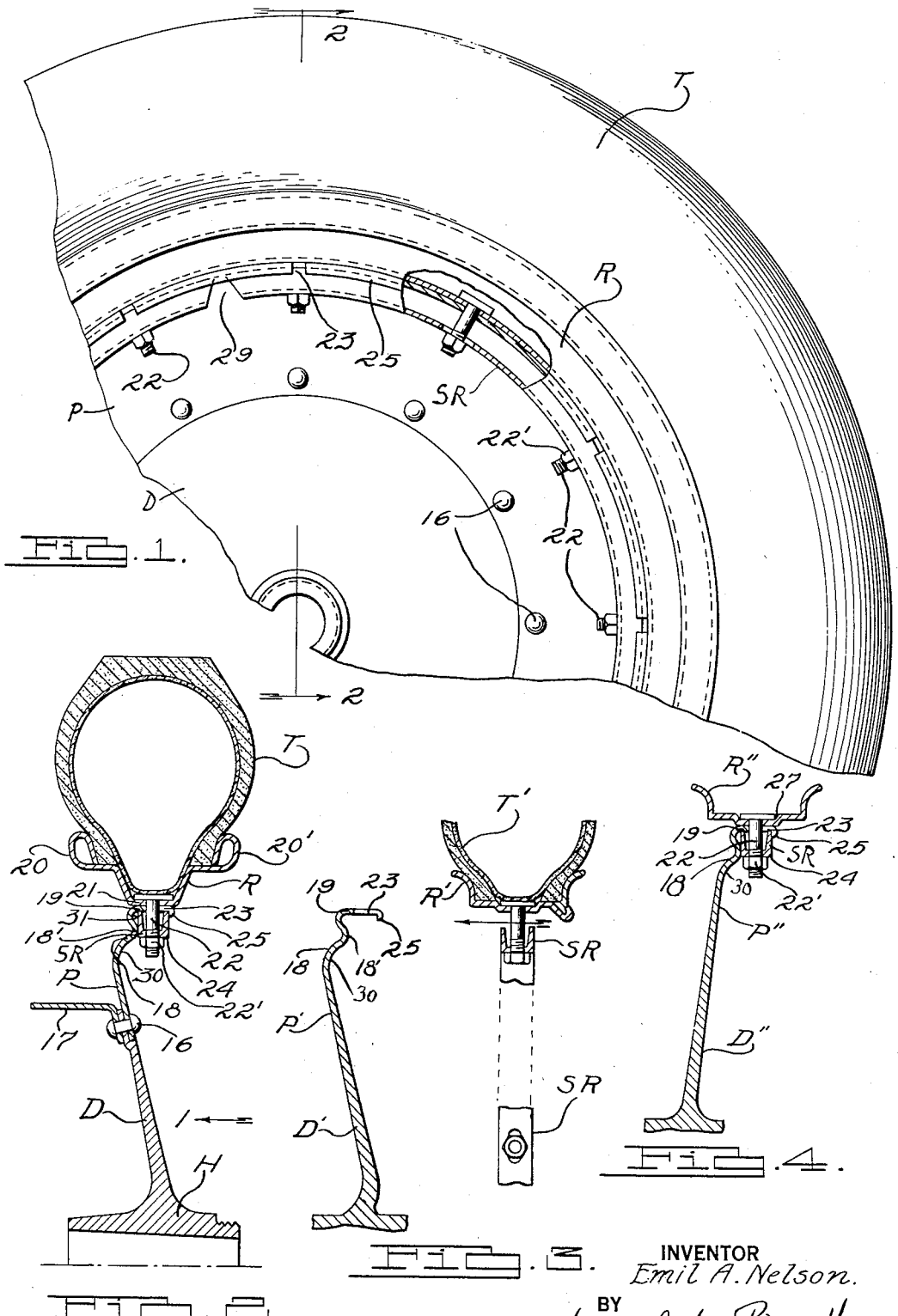

VEHICLE WHEEL

Emil A. Nelson, Detroit, Mich.

Application April 23, 1930. Serial No. 446,475

7 Claims. (Cl. 301—11)

Although this application is broadly entitled, it relates specifically to wheels which include demountable rims,—such as have been disclosed in my prior U. S. Patent No. 1,802,773 granted April 28, 1931, filed October 28, 1926, and Serial No. 210,788, filed August 5, 1927, and may be considered as a continuation in part of the former.

In attaching demountable rims, it has been a common practice to support the same only in "spots",—as by a series of wedge members inserted between the rim and a part of the wheel to expand the rim and crowd it laterally against a shoulder upon the wheel. In this type of mounting, the rim is so liable to be forced out of round that much care must be exercised in mounting. As compared with the above, the present invention aims to provide a mounting wherein the rim, guided to and held in substantially concentric relationship to the wheel axis, is removably but firmly seated throughout its entire circumference. A peripheral portion of the wheel is preferably shaped to provide annular channels and also provide a substantially cylindrical surface for engagement by a rim. This surface may be provided by a flange or web extending axially outward and so slotted as slidably to receive rim-retaining bolts; and said web may, in turn, be provided with a flange extending radially inward and serving not only for a reinforcing effect, and to provide an inclined guide surface over which a rim may be easily advanced, but also to provide a side of a channel to receive and retain a special split ring through which the mentioned bolts may extend. Said rim, with or without a tire thereon, may remain united to said ring by said bolts during storage and application or removal.

It is a further object of the present invention to provide for the mounting of rims of different widths or shapes alternatively upon the same wheel; and preferred embodiments of the invention may include, upon a central wheel element including a hub and a disc, a sheet metal or other peripheral portion or member provided with an annular corrugation or offset opposite a radially and axially inner edge of said ring and so shaped as not only to include the mentioned rim-seating cylindrical web provided with a reinforcing flange, but to receive said split ring between said offset and said flange; and said ring may have the somewhat special channel configuration and relationships hereinafter referred to. The mentioned ring serves to compensate for any loss of strength due to slotting of the mentioned web and to provide or supplement a substantially continuous annular stiffening element disposed radially interiorly thereof.

Other objects of the present invention, including the provision of a special reinforcing and rim-retaining split ring including substantially parallel flanges and a slotted web, and including also the provision of a preassembled organization of a rim, a tire, and a split ring, suitable to be applied and removed as a unit and without deflating any tire on said rim, may be best appreciated from the following descriptions of illustrative embodiments of the invention,—taken in connection with the appended claims and the accompanying drawing.

Fig. 1 is an outside elevational view of a wheel equipped with an embodiment of the present invention,—this view being taken substantially as suggested by the arrow 1 of Fig. 2.

Fig. 2 is a radial sectional view, taken substantially as suggested by the line 2—2 of Fig. 1.

Figs. 3 and 4 are sectional views corresponding portions of Fig. 2 but showing slightly different type embodiments of the invention; and Fig. 3 shows a ring-and-rim assembly as being applied or removed.

Referring first to the more general features of that embodiment of the invention which is illustrated in Figs. 1 and 2, a wheel casting including a hub H and a disc D is shown as provided with a sheet metal peripheral portion P. The latter is shaped for external engagement by a rim R, carrying a tire T, and for internal engagement by a split ring SR.

When the peripheral portion is not formed integral with a disc, means such as bolts, screws or rivets 16, shown as serving to secure the peripheral member or portion P to an offset flange at the edge of disc D, may serve to secure also a brake drum 17; the peripheral portion P, whether or not formed as a separate member, may be outwardly deflected, as at 18, to provide a wrench-receiving channel or space adjacent an annular shoulder 18' and opposite a lower and inner edge of the split ring SR; and it may be thereafter outwardly bent, in an axial direction, to provide a slightly conical or substantially cylindrical rim-seating web flange portion 19 for continuous external engagement by the rim R, or its equivalent.

The rim R is shown as including, in addition to inwardly rebent tire-receiving flanges 20, 20', an offset bottom wall 21 adapted to seat upon the flange portion 19,—the parts referred to being both preferably substantially cylindrical in form and/or adapted closely to interfit. The rim is shown as detachably secured in place by fastening means comprising bolts 22, each having preferably a flat and rectangular or other special head seating in the bottom of the rim channel. Said bolts are shown as passing radially through openings in the bottom of the channel 21 and through laterally and axially outwardly open slots 23 (cut inward from the free outer edge of the seating web 19 and interrupting any flange at said edge) and also through a bottom web 24 of the split ring SR. It may be regarded as immaterial whether heads or shoulders on bolts 22 be given a non-circular cross section to prevent rotation; but the illustrated form of the peripheral member P, whether cast or stamped, will be seen to provide a suitable clearance for the manipulation of a wrench in the tightening of nuts 22',—whereby the split ring SR is drawn into contact with the radially inner side of the flange 21, to strengthen the same and clamp it firmly between said ring and the rim R; and the free edge portion of the rim-seating flange or web 19 is shown as turned radially inwardly to form an annular flange or rib 25, adapted to engage a flat or slightly inclined surface adjacent an axially and radially outer edge of the split ring SR. It may advantageously have a wedge fit therewith, the more efficiently to hold the same against coming off after the nuts 22' are tightened, as above referred to. Said rib or flange being effective to prevent lateral or axial movement of the rim on its seat in one direction, the engagement of said ring, at its diagonally opposite side or edge, with the shoulder or annular corrugation or offset 18' will be seen to obviate undesired axially inward movement of the rim. The rim thus has a continuous seat upon a slotted supporting flange extending axially outward and terminating in a flange or rib which extends radially inward; and the mentioned bolts serve detachably to secure the rim and ring both in place, for a mutual reinforcing effect. From another point of view, the split ring SR serves to strengthen the slotted rim-supporting flange by clamping it firmly between said rim and said ring; and the described construction will be seen to provide for the ready demounting of the rim assembly upon a mere backing off of the nuts 22' on the bolts 22 sufficiently to permit the contraction of said ring and its removal laterally past the rib or flange 25,—the ring and its bolts preferably coming away with the rim whether or not it then carries a tire T.

The annular offset or a corrugation providing shoulder 18' will be seen to provide not only a stop, serving as an abutment for ring SR, but also to separate a wrench-receiving or clearance channel 30 from a ring receiving channel 31 adjacent thereto; and both said shoulder and said wrench-receiving channel will be seen to face axially outward or toward the flange 23,—the general construction being preferably such as to throw the rim R into substantially the same plane with hub H and yet to provide an expansion-tolerant connection therebetween. A split 29 in the ring SR, having the form of a channel facing radially outward, is shown in Fig. 1 as positioned between two of the bolts 22, as the latter are spaced and held by said ring. The configurations of mentioned cooperating parts and the openings therein will naturally be such as to permit expansion and contraction of the ring SR to the degree required for an initial slidable advance of said bolts in slots 23,—the nuts 22 being preferably loosened without complete removal whenever a rim and its associated tire and ring are to be taken off or put on as a pre-assembled organization; but the tightening of said nuts will be seen to give to said ring, as the nuts 22' apply pressure to its bottom web 24 and by reason of the mentioned engagement of the adjacent lateral flanges of said ring with cooperating parts, an important strengthening and supportive function which obviates the use of a felloe and is additional to the rim-retaining function above referred to; and it will be evident that a rim having thereon a smaller tire may be substituted at will for that shown in Figs. 1 and 2.

In Fig. 3, the disc D' is shown as not only integral with the peripheral member or portion P' but as including an axially inward deflection near the point of its union with the hub; the rim R' is shown as of a detachable side ring type; and sufficient of the ring SR is shown to emphasize the fact that the slots therein provided for the reception of bolts 22 are preferably somewhat elongated in a peripheral direction at right angles to the bolt-receiving slots 23 in the flanges 19. Disc D'', shown in Fig. 4, will be seen to present such a deep axially outwardly facing and substantially conical concavity as to bring the axially inner flange of the rim R'' thereon, shown as of a "straight side" split ring type, into substantially the same plane, perpendicular to the wheel axis, with the innermost portion of the disc D'' at the line of its connection with the hub; but mention of the variations last referred to is intended primarily to emphasize the facts that the specific configuration of any disc D or D' or D'', or other means for the connection of a radially outer portion P or P' or P'' having the described general configuration with a hub, is comparatively immaterial to the present invention; and that nothing in the terminology herein employed should be taken to imply either the desirability of forming some or all parts of the member P, or P' or P'' integral with the discs with which they are shown or the desirability of uniting concentric wheel members at any specific radial distance from a hub or by any specific means,—provided that lightness, strength, economy in manufacture and/or facility of substitution are obtained by means such as these herein described and claimed.

The more important of the unusual functions of the various novel parts comprised in the present invention having been fully indicated in connection with the respective descriptions thereof, it may be emphasized, in conclusion, that various features of the present invention might be independently employed; and also that numerous modifications, additional to any suggested herein, might easily be devised by skilled workers, if informed of the foregoing,—all without departure from the spirit and scope of the present invention, as the latter is indicated above and in the following claims.

What I claim is:

1. In a disc wheel for the reception of a removable rim: a peripheral member providing both a rim-seating web and a flange, extending radially inward and continuous with said web, for the retention of a ring radially inwardly opposite a rim on said web,—said member including also an annular corrugation providing a shoulder for engagement by said ring.

2. In a disc wheel for the reception of a removable rim: a peripheral member providing a rim-seating web and a flange extending radially inward and constituting means continuous with said web, for the retention of a ring radially inwardly opposite a rim on said web,—said member including also an annular corrugation providing both a shoulder for engagement by said ring and a wrench-receiving channel adjacent thereto.

3. In a disc wheel for the reception of a removable rim: a peripheral member providing both a rim-seating web and a flange extending radially inward and constituting means, continuous with said web, for the retention of a ring radially inwardly opposite a rim on said web,— said member including also an annular corrugation providing both a shoulder for engagement by said ring and also forming with said flange a ring-receiving channel between said flange and said corrugations.

4. A wheel comprising a web having a rim supporting flange at its outer edge, which is directed substantially in an axial direction, said flange at its free edge terminating in a projection directed radially toward the wheel axis, fastening bolts projecting radially through the flange, a rim mounted on the outer surface of the flange and having openings for the bolts, a transversely split clamping ring engaging the inner periphery of the flange and having openings for receiving the bolts, and means on the radially inner ends of the bolt for clamping the rim flange and ring together, said ring being channel shaped in axial cross section with the channel opening radially outwardly, the web and projection at the opposite edge of the flange cooperating with the legs of the channel, to prevent axial displacement of the ring.

5. In combination, a disc having an axially directed web at its radially outer edge, said web having axially directed, circumferentially spaced slots open to the free edge of the web, the outer edge of the web being turned radially inwardly, a rim seated on the outer circumference of the web, bolts operatively secured to the rim and projecting radially through the slots in the web, and a fastening means on the radially inner ends of the bolts which is maintained in axial position by the flange and the side of the disc.

6. A wheel comprising a disc having an axially directed web at its radially outer edge, said web having axially directed, circumferentially spaced slots open to the free edge of the web, the outer edge of the web being turned radially inwardly, a rim seated on the outer circumference of the web, bolts operatively secured to the rim and projecting radially through the slots, and channel fastening means on the inner ends of the bolts having their legs directed outwardly so as to be maintained in axial position by the flange and the side of the disc.

7. A wheel comprising a disc having an axially directed web at its outer edge, said web having axially directed, circumferentially spaced slots open to the free edge of the web, the outer edge of the web being turned radially inwardly to provide a flange, a rim seated on the outer circumference of the web, bolts secured to the rim and projecting radially through the slots in a radial direction, a split ring of channel shape with the channel opening radially outwardly, disposed against the inner circumference of the web so that the legs of the channel are maintained in axial position by means of the flange and the side of the disc, said bolts projecting through the base of the channel, and nuts on the inner ends of the bolts for tightening the rim and channel member against opposed surfaces of the web.

EMIL A. NELSON.